United States Patent
Stauch

(10) Patent No.: US 9,670,005 B2
(45) Date of Patent: Jun. 6, 2017

(54) SELF CLEANING APPARATUS FOR A BELT CONVEYOR

(71) Applicant: Prairie Machine & Parts Mfg., Saskatoon (CA)

(72) Inventor: William D. Stauch, Saskatoon (CA)

(73) Assignee: Prairie Machine & Parts MFG.—Partnership (CA)

( * ) Notice: Subject to any disclaimer, the term of this patent is extended or adjusted under 35 U.S.C. 154(b) by 0 days.

(21) Appl. No.: 15/207,872

(22) Filed: Jul. 12, 2016

(65) Prior Publication Data

US 2017/0043960 A1 Feb. 16, 2017

Related U.S. Application Data

(60) Provisional application No. 62/204,163, filed on Aug. 12, 2015.

(51) Int. Cl.
*B65G 47/22* (2006.01)
*B65G 45/26* (2006.01)
*B65G 39/073* (2006.01)

(52) U.S. Cl.
CPC ........... *B65G 45/26* (2013.01); *B65G 39/073* (2013.01)

(58) Field of Classification Search
CPC .............................. B65G 39/073; B65G 45/26
USPC ................ 198/493, 494, 836.1, 836.4, 860.3
See application file for complete search history.

(56) References Cited

U.S. PATENT DOCUMENTS

| | | | | | |
|---|---|---|---|---|---|
| 2,523,259 | A | * | 9/1950 | Aber | B07B 1/24 209/284 |
| 5,129,508 | A | * | 7/1992 | Shelstad | B65G 21/2081 198/836.1 |
| 5,303,813 | A | * | 4/1994 | de Rooy | B65G 21/2081 198/525 |
| 5,400,897 | A | * | 3/1995 | Doyle | B65G 45/18 198/496 |
| 5,622,249 | A | * | 4/1997 | Morin | B65G 45/16 15/256.6 |
| 6,086,061 | A | * | 7/2000 | Vedoy | B65H 1/22 198/586 |
| 6,293,389 | B1 | * | 9/2001 | Knapp | B65G 15/62 198/823 |
| 6,422,381 | B1 | * | 7/2002 | Eberle | B65G 15/08 198/821 |
| 6,905,546 | B2 | * | 6/2005 | Mainieri | B05B 13/0221 118/309 |
| 7,966,744 | B2 | * | 6/2011 | Kim | B09B 3/00 34/217 |
| 8,240,460 | B1 | * | 8/2012 | Bleau | B65G 45/14 198/494 |

(Continued)

*Primary Examiner* — Douglas Hess
(74) *Attorney, Agent, or Firm* — Roger D. Emerson; Emerson, Thomson & Bennett, LLC

(57) ABSTRACT

A self cleaning apparatus for a belt conveyor. The self cleaning apparatus comprises a rotor positioned adjacent to an outer side edge of the return conveyor portion of the belt, and a rotor housing received about the rotor. The rotor housing has an intake and a discharge, with the intake receiving and directing material on the upper surface of the return conveyor portion to the rotor as the belt rotates. Rotation of the rotor causes the directed material to be propelled by the rotor through the discharge and to be deposited onto the upper surface of the loaded conveyor portion.

13 Claims, 10 Drawing Sheets

(56) References Cited

U.S. PATENT DOCUMENTS 9,339,907 B2 * 5/2016 Matsuyama ....... B23Q 11/0057
9,511,942 B2 * 12/2016 Guernsey ............... B65G 21/02

* cited by examiner

SELF CLEANING APPARATUS FOR A BELT CONVEYOR

TECHNICAL FIELD

This invention relates generally to the bulk handling of materials, and in particular to belt conveyor systems.

BACKGROUND

Conveyor systems are a common method for the bulk handling of materials. For example, conveyors are used in the mining and mineral processing industries, to move aggregates, for the transfer of agricultural materials and food products, and in the chemical industry. One very common form of conveyor system is the belt conveyor.

Typically, belt conveyors include an elongate belt that is joined at each end to form a continuous loop that may be rotated to move material between locations. Belt conveyors have a tail end (i.e. the end upon which material to be transported is deposited) and a head end (i.e. the end from which material is deposited at an alternate location). The tail end of the conveyor includes a tail pulley and the head of the conveyor contains a head pulley, with the continuous loop belt received around the tail and head pulleys. Product or material may be loaded onto the conveyor at its tail end in a variety of different ways. For example, material may be deposited onto the belt through the use of a bin or hopper, through placing the material on the conveyor manually, or through the use of the bucket of a loader or excavator. The rotating belt then transports the material from the tail end to the head end, after which it is released from the conveyor onto a subsequent conveyor, into a further hopper or other container, or simply into a pile for subsequent use.

Since a belt container is effectively a continuous loop of belting that is rotated to transport material from place to place, it includes an upper or "loaded" conveyor portion and a lower or "return" conveyor portion. During use, material that is deposited onto the upper surface of the upper or loaded portion of the conveyor is sometimes dislodged or otherwise spills from the upper portion onto the upper surface of the return portion of the belt. In other cases, during the process of loading the conveyor (particularly when material is deposited on the conveyor through the use of a loader or excavator) material intended to be deposited on the upper portion of the conveyor may instead fall upon the return portion. Since the return portion is moving in a direction from the head of the conveyor toward the tail of the conveyor, material that finds its way onto the upper surface of the return portion will eventually contact the tail pulley and/or other structures at the tail end of the conveyor. That material then tends to be discarded from the belt and fall onto the ground adjacent the tail of the conveyor. Eventually, when sufficient material has accumulated on the ground, it becomes necessary to remove the material and re-deposit it upon the upper surface of the belt, place the material back into a hopper or loading bin, or otherwise process or dispose of the material.

Material that finds its way onto the return portion of the conveyor may also come into contact with the tail pulley, tail pulley shaft, shaft bearings and other components of the tail end of the conveyor, potentially causing premature wear and damage. In order to help prevent damage and premature wear of the parts and components of the tail end of the conveyor, others have proposed the use of cleaning bars or arms that extend across the upper surface of the return portion of the conveyor at or near its tail end. Such bars or arms assist in wiping or cleaning the upper surface of the return belt, and to remove material that may have been spilled or accumulated thereon. While such devices are somewhat effective in helping to minimize the damage or wear that may occur to the components of the tail of the conveyor, they nevertheless still result in the accumulation of material upon the ground adjacent to the conveyor, requiring the material to be cleaned up once a sufficient amount has accumulated.

SUMMARY

The invention therefore provides a self cleaning apparatus for a belt conveyor, the belt conveyor of the type having a continuous loop belt, mounted about a head pulley at one end of the conveyor and a tail pulley at an opposite end of the conveyor, and further including a loaded conveyor portion and a return conveyor portion, each of the loaded and return conveyor portions having upper surfaces, the self cleaning apparatus comprising a rotor positioned adjacent to an outer side edge of the return conveyor portion of the belt, a rotor housing received about said rotor, said rotor housing having an intake and a discharge, said intake receiving and directing material on the upper surface of the return conveyor portion to said rotor as the belt rotates, such that rotation of said rotor causes the directed material to be propelled by said rotor through said discharge and to be deposited onto the upper surface of the loaded conveyor portion.

In a further aspect the invention provides a self cleaning apparatus for a belt conveyor, the belt conveyor of the type having a continuous loop belt, mounted about a head pulley at one end of the conveyor and a tail pulley positioned on a tail pulley shaft at an opposite end of the conveyor, and further including a loaded conveyor portion and a return conveyor portion, each of the loaded and return conveyor portions having upper surfaces, the self cleaning apparatus comprising a rotor positioned adjacent to an outer edge of the return conveyor portion of the belt, said rotor mounted to and rotating with the tail pulley shaft, a rotor housing received about said rotor, said rotor housing having an intake and a discharge, said intake positioned in proximity to the upper surface of the return conveyor portion of the belt and receiving and directing material on the upper surface of the return conveyor portion to said rotor as the belt rotates, such that rotation of said rotor by the tail pulley shaft causes the directed material to be propelled by said rotor through said discharge and to be deposited onto the upper surface of the loaded conveyor portion.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

The present invention may be embodied in a number of different forms. The specification and drawings that follow describe and disclose some of the specific forms of the invention.

Figure 1:
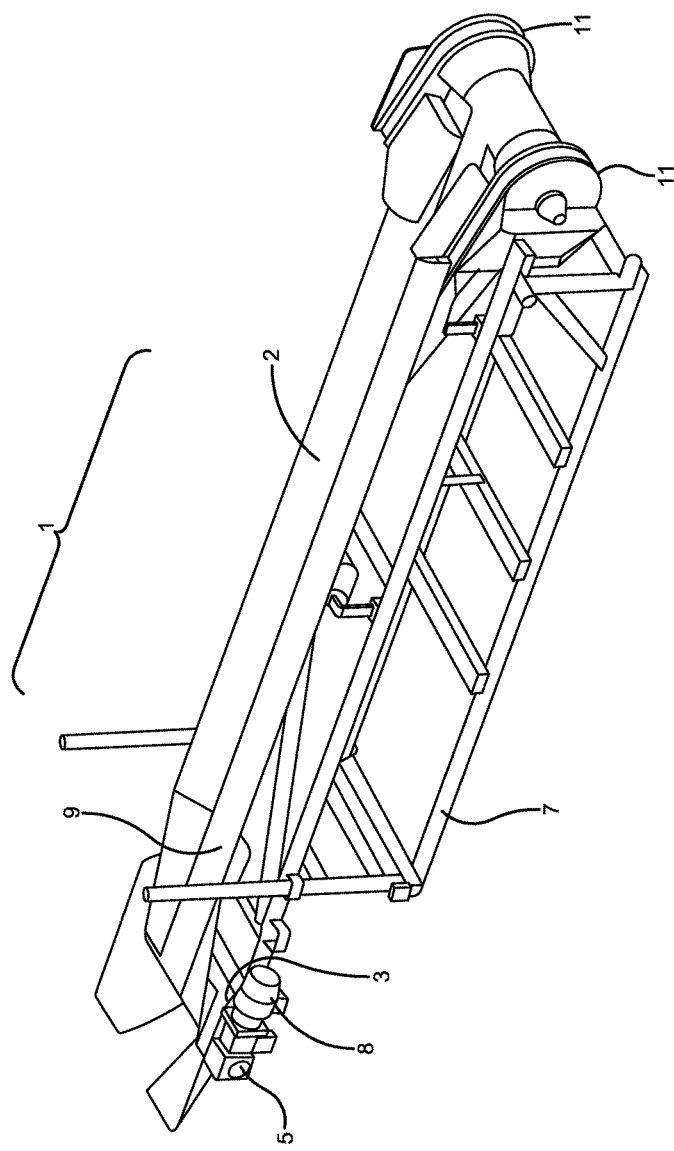
FIG. 1 is an upper side perspective view of a typical belt conveyor having incorporated into it an embodiment of the present invention.
Figure 2:
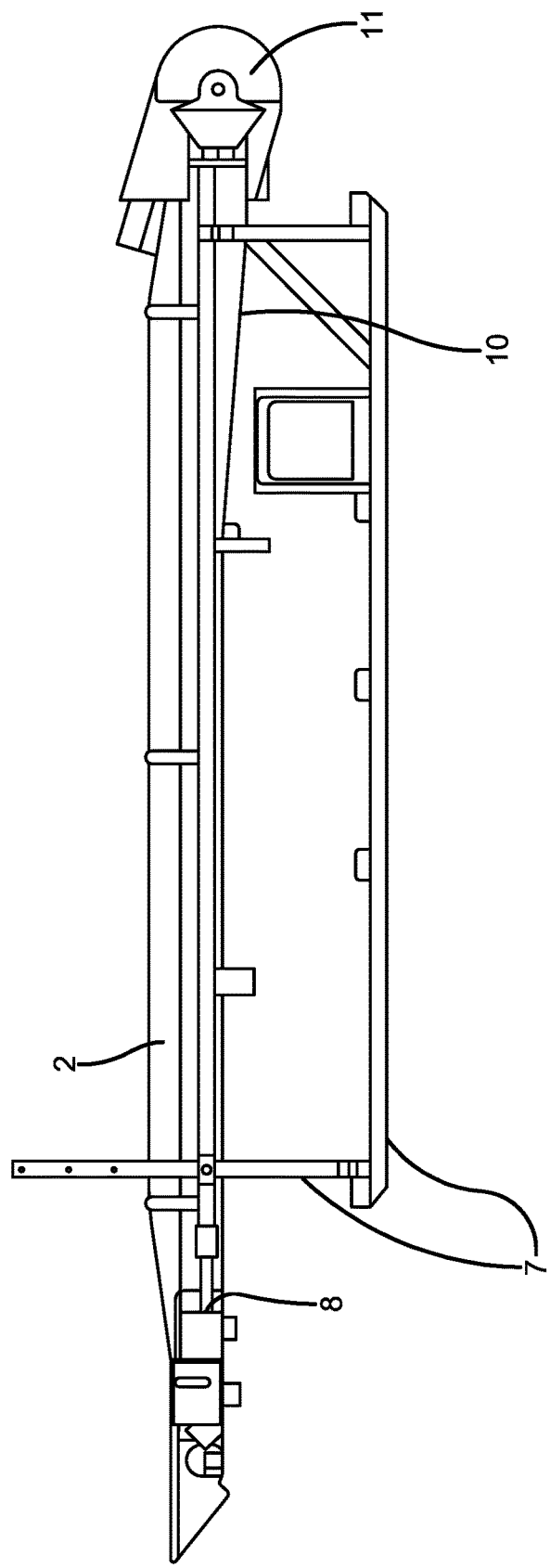
FIG. 2 is a side elevational view of the conveyor shown in FIG. 1.
Figure 3:
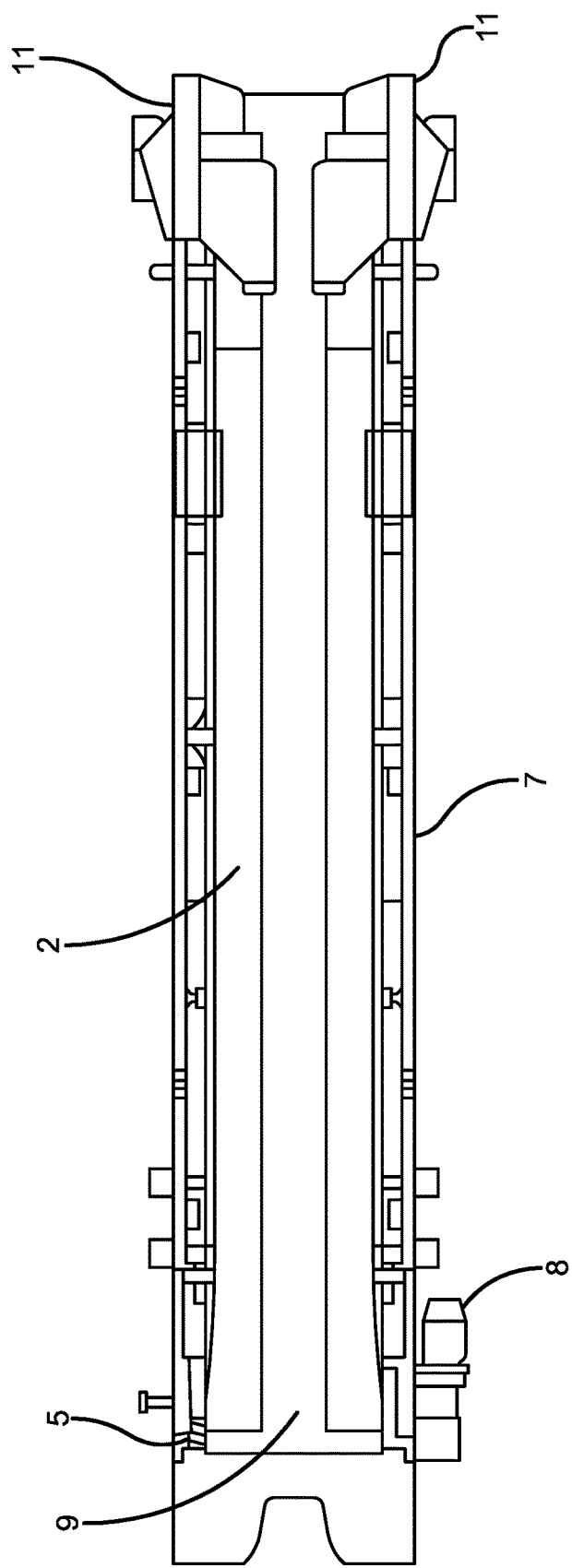
FIG. 3 is a plan view of the conveyor shown in FIG. 1.
Figure 4:
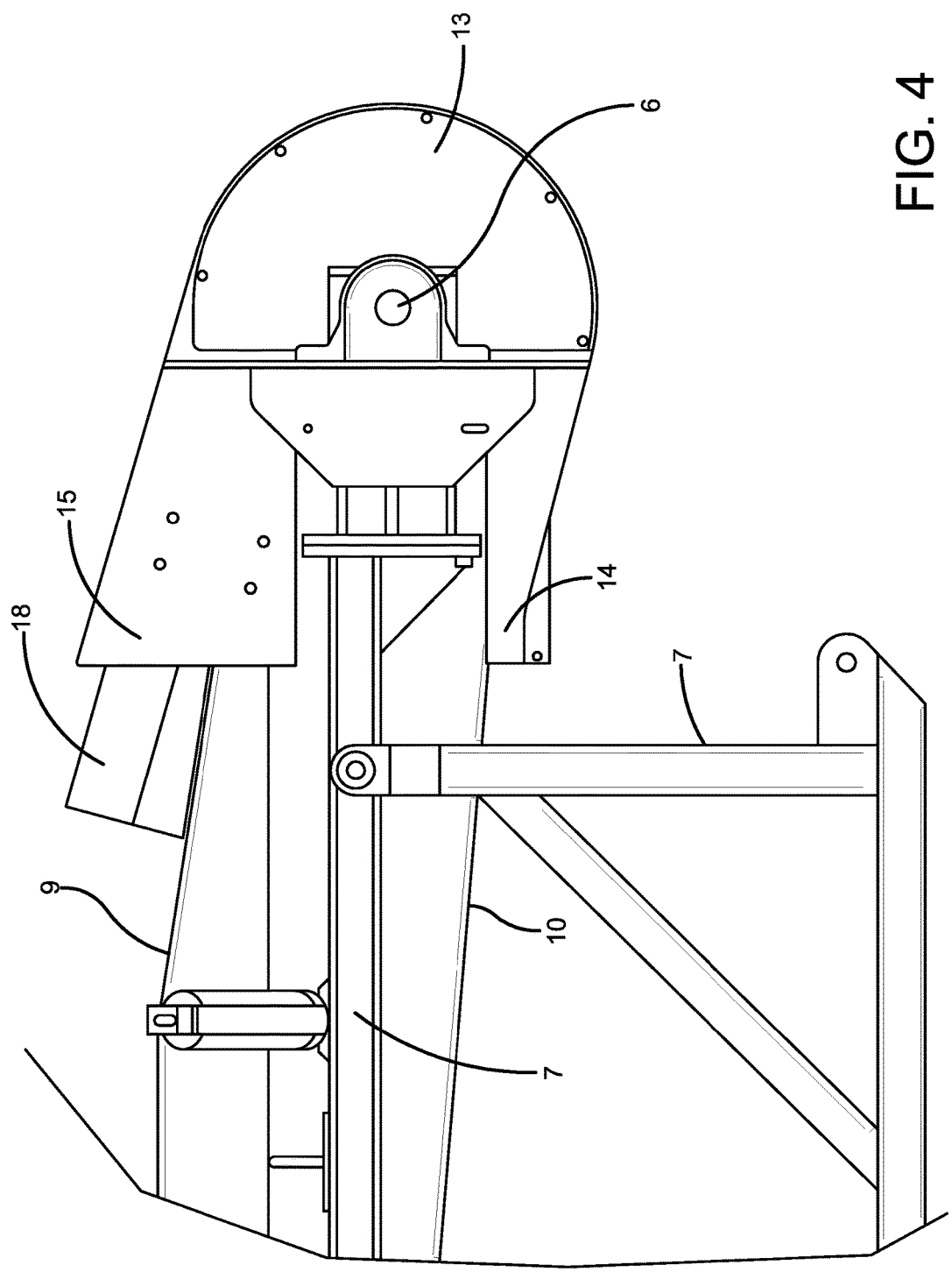
FIG. 4 is an enlarged left side view of the tail end assembly of the conveyor of Figure
Figure 5:
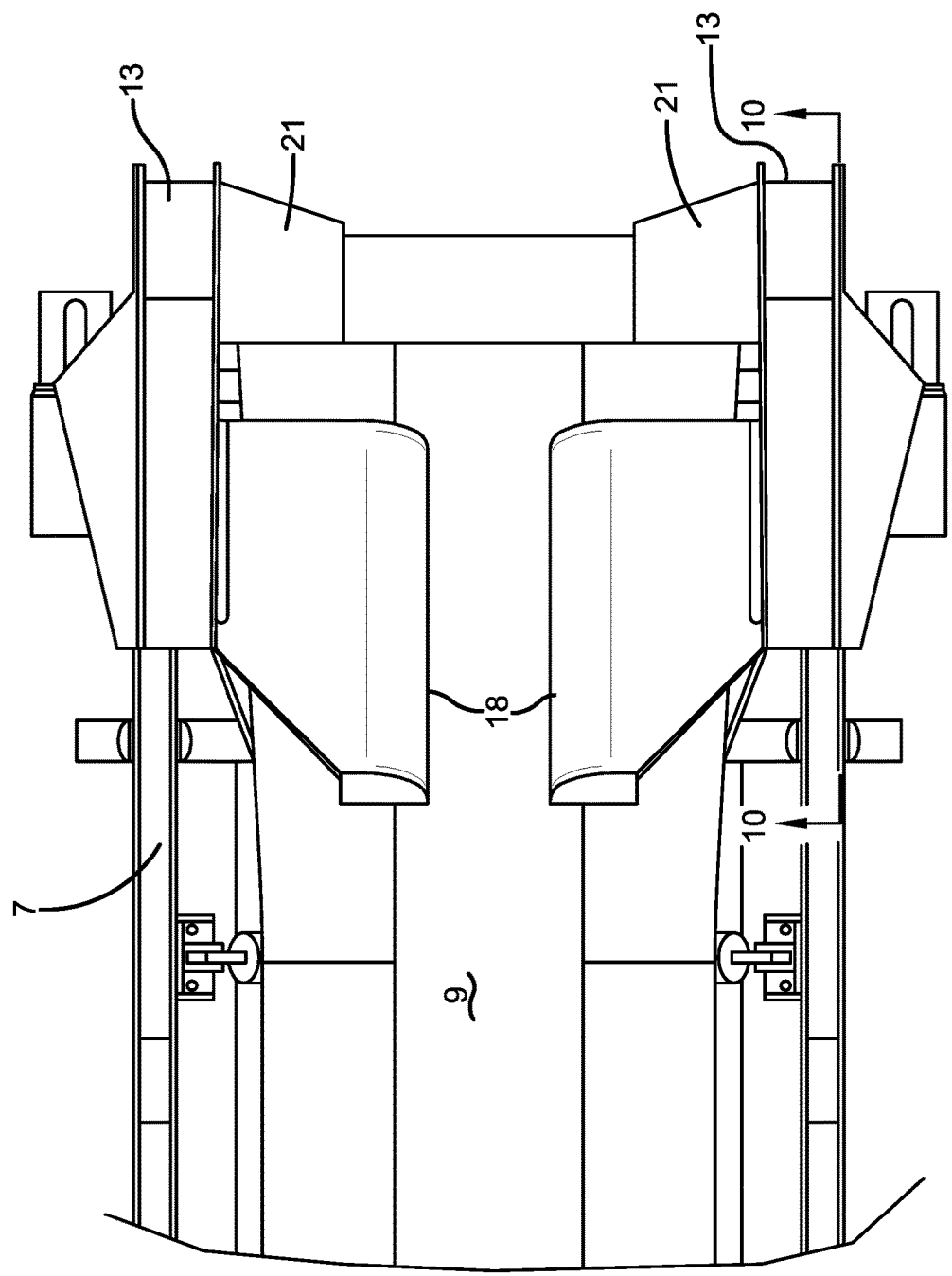
FIG. 5 is a plan view of the tail end assembly of the conveyor of FIG. 1.
Figure 6:
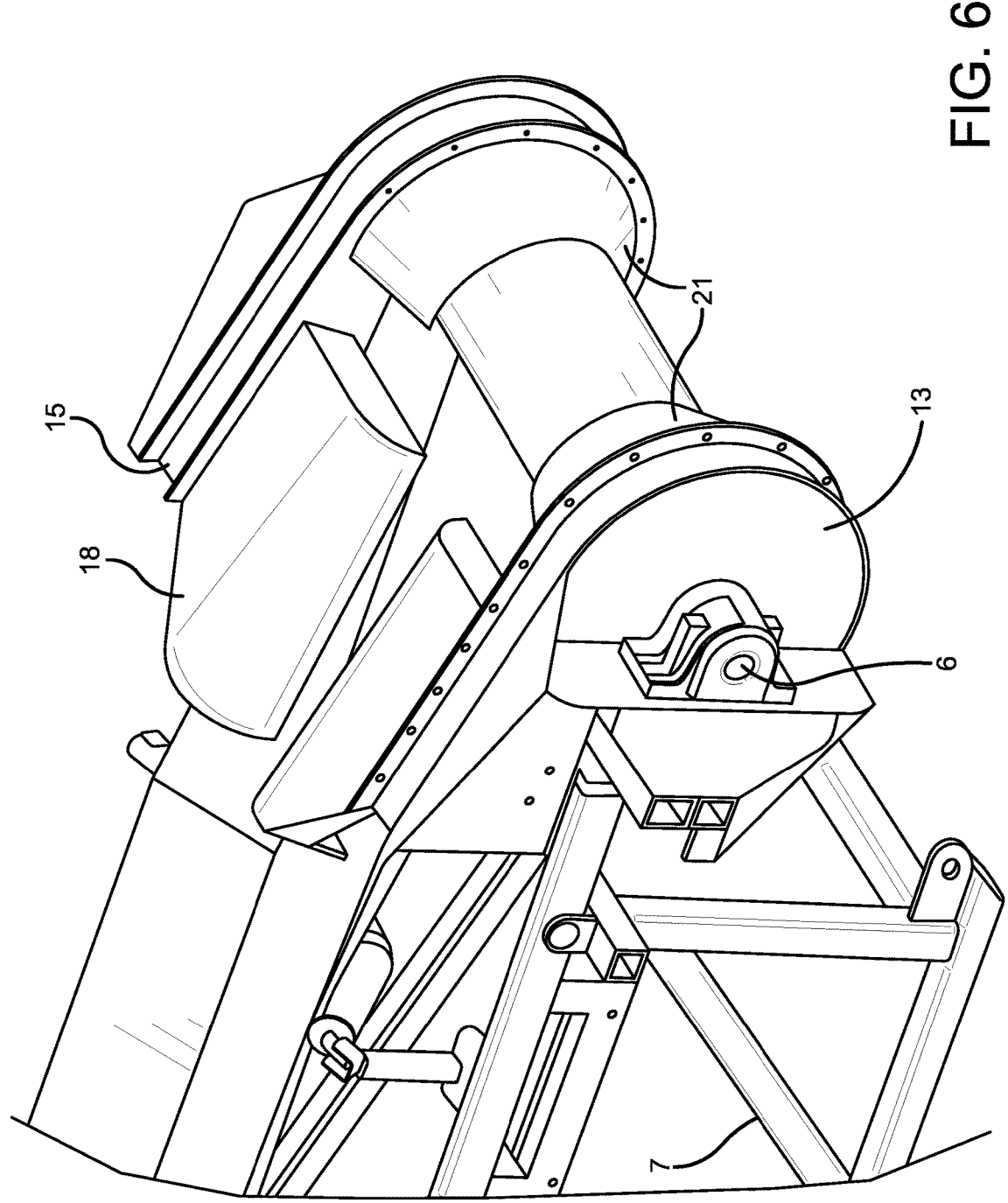
FIG. 6 is a left side perspective view of the tail end assembly of the conveyor of Figure
Figure 7:
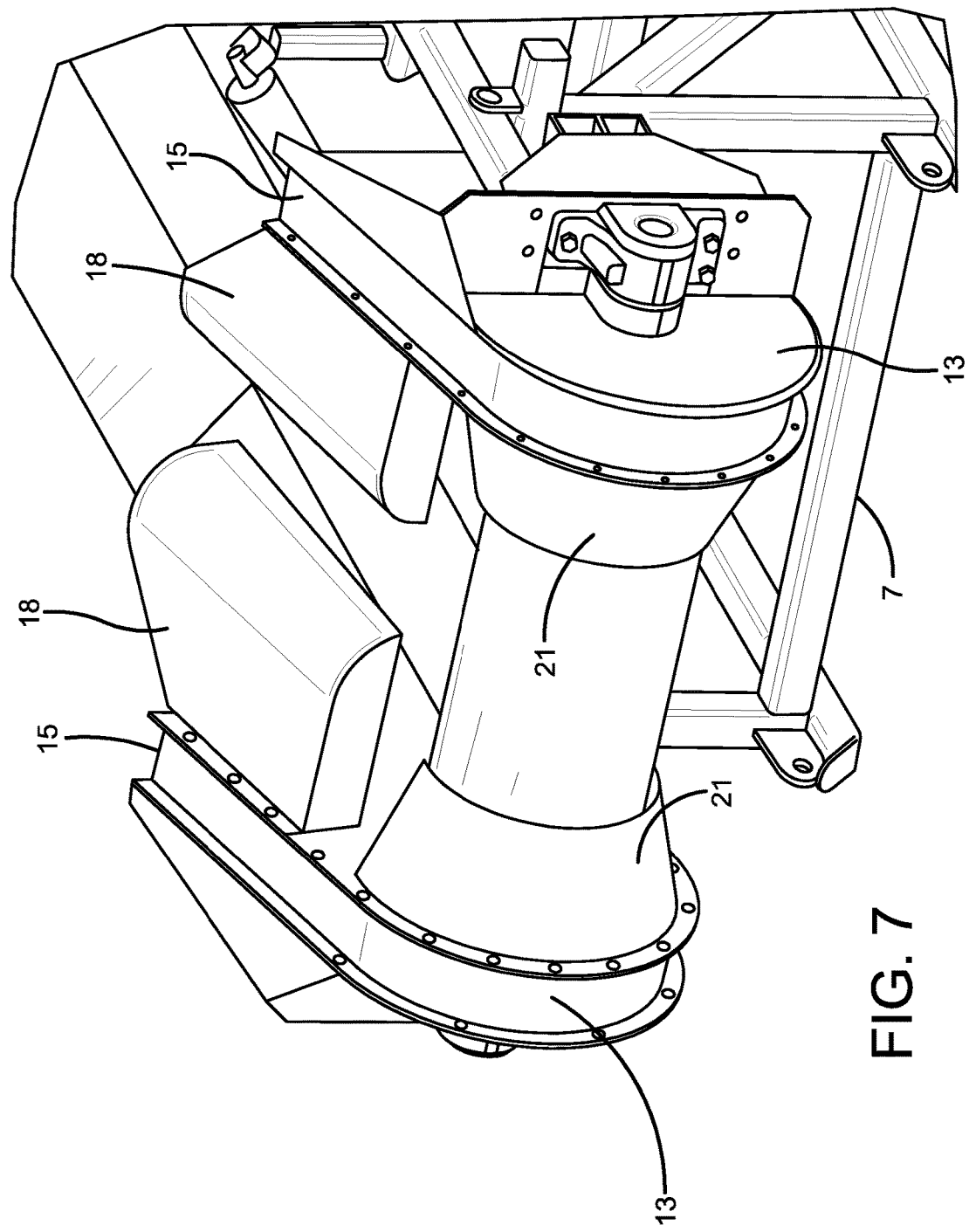
FIG. 7 is a right side perspective view of the tail end assembly of the conveyor of FIG. 1.
Figure 8:
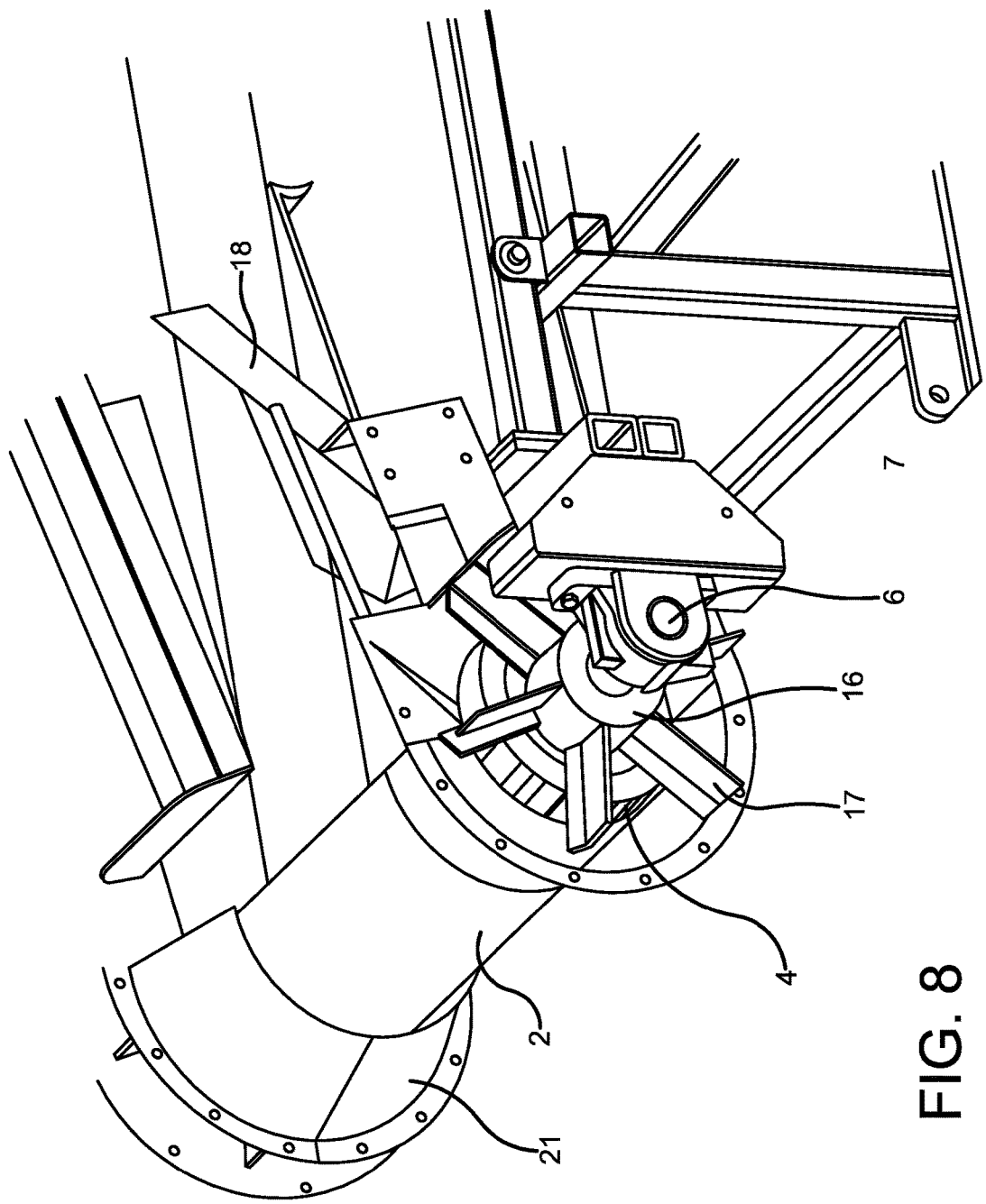
FIG. 8 is a view similar to FIG. 7 wherein the outer cover of the right side of the tail assembly has been removed.
Figure 9:
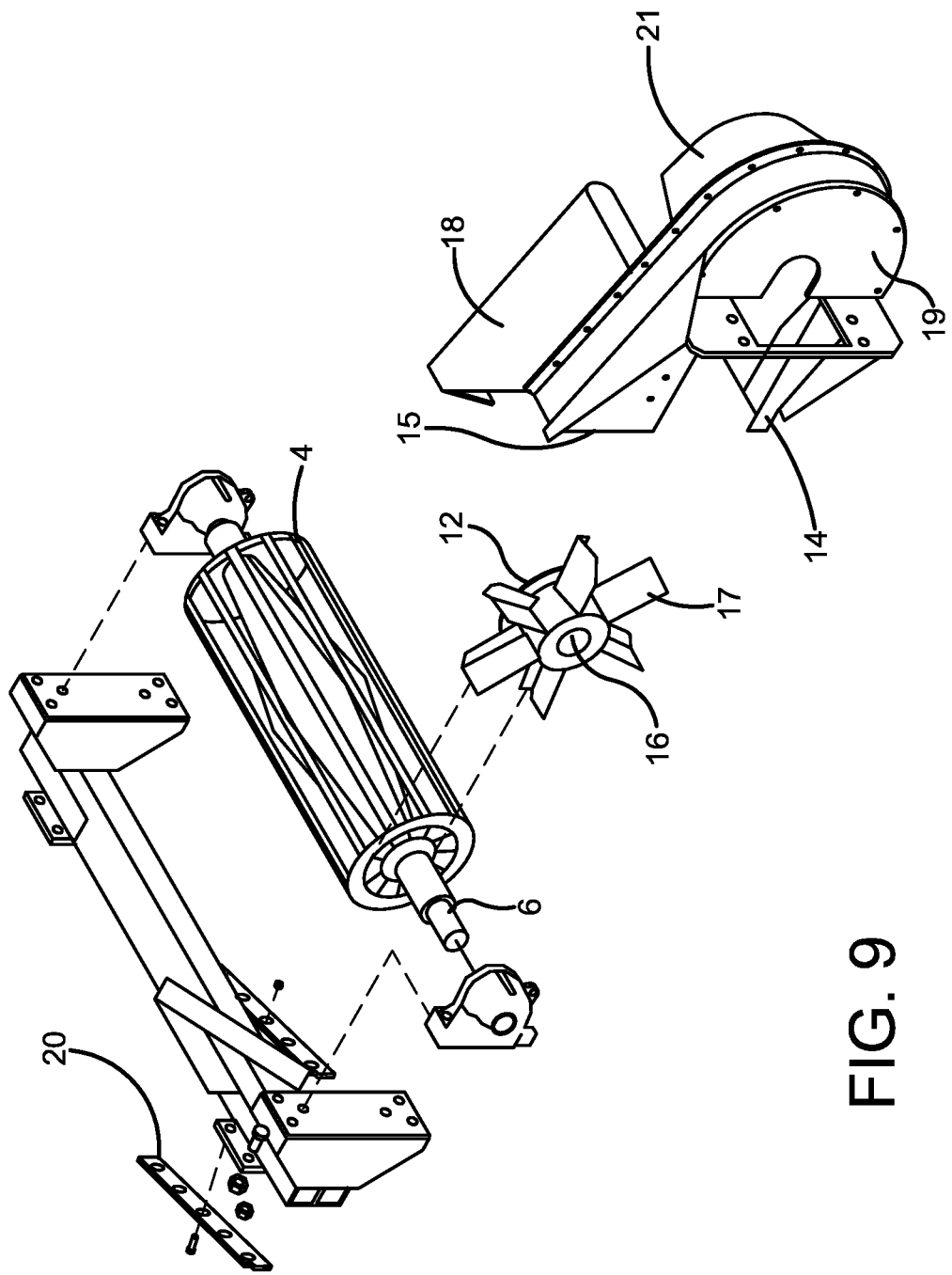
FIG. 9 is a partially exploded view of the primary components of the left portion of the tail assembly of the conveyor of FIG. 1.
Figure 10:
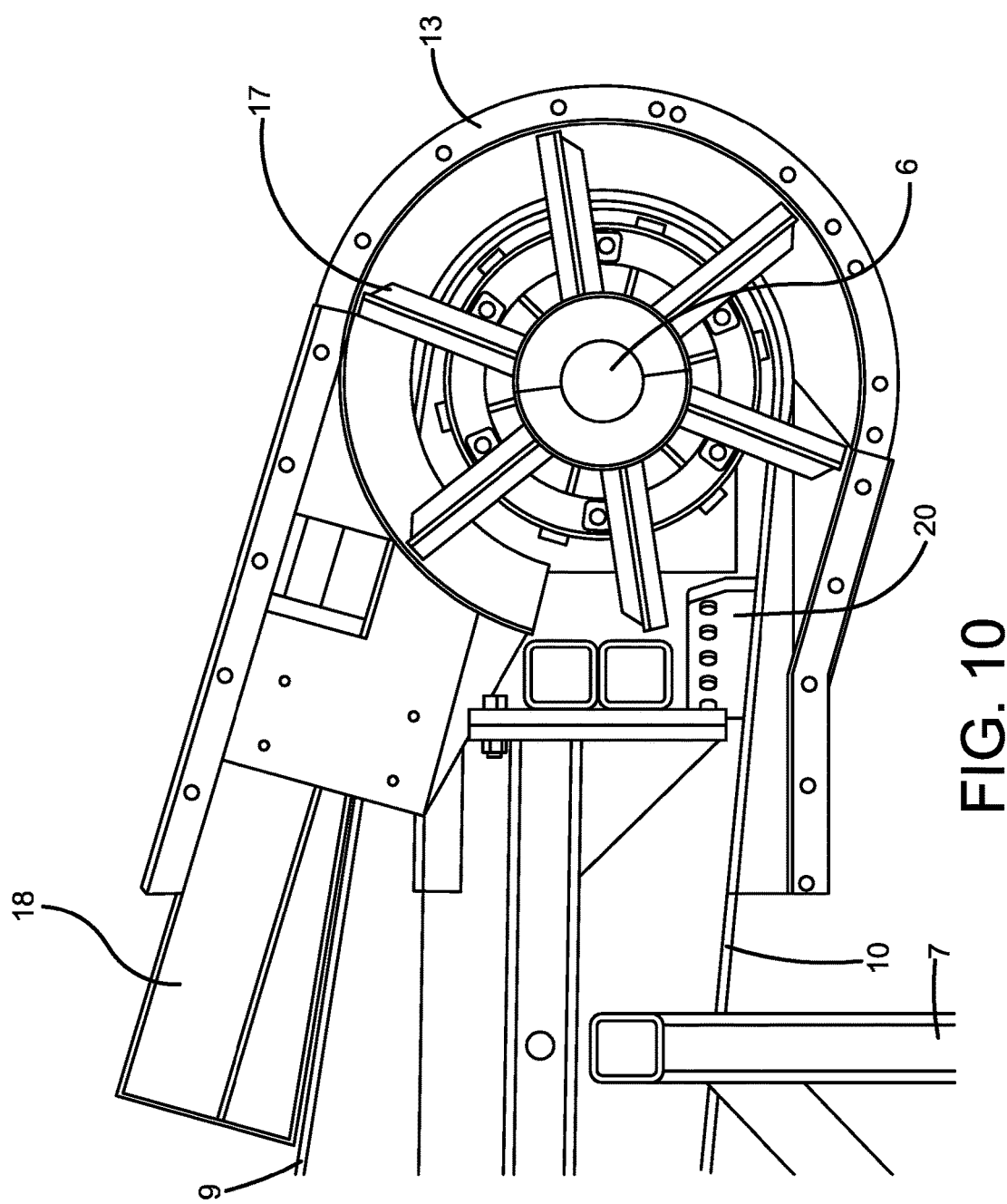
FIG. 10 is a sectional view taken along the line 10-10 of FIG. 5.

With reference specifically to FIGS. 1 through 3, there is shown a generic belt conveyor 1 incorporating a self cleaning apparatus constructed in accordance with an embodiment of the invention. Belt conveyor 1 is a typical or commonly utilized conveyor formed using a continuous loop belt 2 that is mounted about a head pulley 3 and a tail pulley 4. Each of the head and tail pulleys are fixed to respective head and tail pulley shafts (5 and 6 respectively), which are rotatably mounted to a conveyor frame 7. In the particular embodiment shown, belt 2 is rotated through use of a drive means 8 (which in this embodiment includes an electric motor that rotates head pulley 5, which in turn causes rotation of belt 2). Although they will not be discussed in detail herein, one of ordinary skill will appreciate that conveyor 1 will include numerous additional features and components that are commonly present on belt conveyors and belt conveyor systems.

The belt conveyor shown in FIGS. 1 through 3, as in the case of most belt conveyors, includes an upper or "loaded" conveyor portion 9 and a lower or "return" conveyor portion 10. Material to be transported by conveyor 1 is loaded upon upper or loaded conveyor portion 9 such that rotation of belt 2 in a direction from the tail pulley end of the conveyor toward the head pulley end of the conveyor causes the material to be transported along the conveyor and ultimately to be deposited over the end of the head pulley.

In accordance with an embodiment of the invention there is provided a self cleaning apparatus (noted generally by reference numeral 11) positioned at the tail end of conveyor 1. In the particular embodiment shown, two such self cleaning apparatuses are present, one on each side of tail pulley 4. It will, however, be appreciated that in alternate embodiments of the invention apparatus 11 need not necessarily be positioned about the tail pulley, but instead may be positioned at other locations along the length of conveyor 1, and that a single apparatus could be utilized.

In general, self cleaning apparatus 11 is comprised of a rotor or fan 12 and a rotor housing 13. Rotor 12 is positioned adjacent to an outer edge of return conveyor portion 10 with rotor housing 13 received about the rotor. With particular reference to FIGS. 4 through 10, rotor housing 13 is comprised of a number of individual component parts, including an intake 14 and a discharge 15. Intake 15 is designed to receive and direct material that may be on the upper surface of return conveyor portion 10 to rotor 12 as belt 2 is rotated. That is, as the belt rotates, return conveyor portion 10 will move from head pulley 3 toward tail pulley 4. Any material that may have been deposited or otherwise fallen onto the upper surface of the return conveyor portion of belt 2 will be carried along the length of the conveyor toward tail pulley 4. As that material is carried along the upper surface of return conveyor portion 10 at least a portion of it will be received and directed to rotor 12 by intake 14.

As shown in the attached drawings, in an embodiment of the invention rotor 12 includes a central hub 16 and a plurality of vanes 17. Material that is received and directed by intake 14 is thus propelled by rotating vanes 17 within rotor housing 13 and expelled through discharge 15. Discharge 15 is preferably positioned in proximity to the upper surface of loaded conveyor portion 9 such that material propelled by rotor 12, through discharge 15, is deposited upon the upper surface of the loaded conveyor portion. To assist in helping to ensure that material propelled through discharge 15 is directed and deposited upon the upper surface of loaded conveyor portion 9, housing 13 may include a deflector 18. If desired, rotor housing 13 could also include a transparent portion 19 to permit a visual inspection of the rotor.

It will be further appreciated by one of ordinary skill in the art that the particular nature and structure of vanes 17 could be altered in order to better accommodate the type or form of material or materials that the rotor is expected to propel onto the upper surface of the loaded conveyor portion. For example, where conveyor 1 is used to transport aggregate (crushed stone, gravel, etc.) vanes 17 will need to be sufficiently robust to withstand the impact and forces associated with receiving and propelling the aggregates. Depending upon the nominal size of the aggregate there may be a significant amount of "clearance" between the edges of vanes 17 and the interior surface of housing 13. However, in instances where the material to be transported by conveyor 1 is of a significantly finer size range (for example crushed ore, grain, or other material having a relatively small particle size), the structure of vanes 17 and the clearance between the vanes and the interior surface of rotor housing 13 may have to be adjusted accordingly. Where a significant amount of liquid is present in the material being transported, the vanes may also be formed with surfaces that create a "scoop" or "concavity" effect to help better retain and propel a wet or viscous material through rotor housing 13 and out discharge 15. It will further be appreciated that, whereas in the attached drawings rotor 12 is secured to and driven by tail pulley shaft 6, in an alternate embodiment the rotor may be independently rotated by means of an additional drive system, which can include an electric or hydraulic drive.

In an embodiment of the invention, apparatus 11 may include a belt return wiper 20 adjacent to return conveyor portion 10, in somewhat close proximity to intake 14. The function of wiper 20 is to direct material on the upper surface of return conveyor portion 10 toward intake 14 of rotor housing 13 as belt 2 is rotated. Once again, it will be understood that depending upon the nature of the material transported by the belt, wiper 20 could be formed from a variety of different materials and could be offset a desired distance from the upper surface of the return conveyor portion.

In the embodiment of the invention shown in the attached drawings it will be noted that rotor housing 13 is shown as including a conical deflector 21 that extends generally from a position adjacent to the interior side surfaces of rotor 12 toward the middle of belt 2, about the exterior surface of the belt where it winds around tail pulley 4. Conical deflector 21 helps to assist in the deposition of material onto the upper surface of loaded conveyor portion 9 and will also help to capture material that may slide off the sides of rotor vanes 17, or that may otherwise fall or become lodged within the interior of rotor housing 13. In general, conical deflector 21 helps to direct material carried along the exterior surface of the belt to the upper surface of loaded conveyor portion 9.

It will further be understood that in most applications belt conveyor 1 will be fitted with a pair of self cleaning apparatuses 11, one at each end of tail pulley 4. In that manner, material that may fall or otherwise be collected upon the upper surface of return conveyor portion 10 can be directed and propelled onto the upper surface of loaded conveyor portion 9 through the operation of the rotors of either of the self cleaning apparatuses. In such a case, two belt return wipers 20 may be incorporated in to the tail of the conveyor to help divide material upon the upper surface of the return conveyor portion so the material is directed to both rotors. Alternately, a single "v"-shaped or wedge belt return wiper may be utilized to effectively split any material upon the upper surface of return conveyor portion 10 and send part of any such material to the rotor on each side of the tail pulley.

Accordingly, it will be understood from a thorough understanding of the invention that there is provided an apparatus to assist in the collection of material that may fall or otherwise be deposited upon the upper surface of the return portion conveyor of a belt conveyor and assist in redirecting such material to the upper surface of the loaded conveyor portion. Doing so provides the benefit of helping to reduce the amount of such material that may otherwise fall to the ground and accumulate next to the tail end of the conveyor. The apparatus may also help to prevent any such material from coming into contact with the tail pulley and the other components at the tail end of the conveyor, thereby helping to minimize damage and wear. Where the rotors of the self cleaning apparatus are mounted to the tail pulley shaft, no additional drive or control mechanisms are required.

It is to be understood that what has been described are the preferred embodiments of the invention. The scope of the claims should not be limited by the preferred embodiments set forth above, but should be given the broadest interpretation consistent with the description as a whole.

I claim:

1. A self cleaning apparatus for a belt conveyor, the belt conveyor of the type having a continuous loop belt, mounted about a head pulley at one end of the conveyor and a tail pulley at an opposite end of the conveyor, and further including a loaded conveyor portion and a return conveyor portion, each of the loaded and return conveyor portions having upper surfaces, the self cleaning apparatus comprising:
    a rotor positioned adjacent to an outer side edge of the return conveyor portion of the belt,
    a rotor housing received about said rotor, said rotor housing having an intake and a discharge, said intake receiving and directing material on the upper surface of the return conveyor portion to said rotor as the belt rotates, such that rotation of said rotor causes the directed material to be propelled by said rotor through said discharge and to be deposited onto the upper surface of the loaded conveyor portion.

2. The apparatus as claimed in claim 1 wherein said discharge includes a deflector, said deflector assisting in the deposition of directed material onto the upper surface of the loaded conveyor portion.

3. The apparatus as claimed in claim 1 wherein said intake is positioned in proximity to the upper surface of the return conveyor portion of the belt.

4. The apparatus as claimed in claim 3 wherein the tail pulley of the belt conveyor includes a tail pulley shaft, said rotor mounted to and rotating with said tail pulley shaft.

5. The apparatus as claimed in claim 4 including first and second rotors positioned on opposite ends of the tail pulley shaft, and further including first and second rotor housings, said first rotor housing received about said first rotor and said second rotor housing received about said second rotor, said first and second rotors propelling the directed material from opposite sides of the return conveyor portion onto the upper surface of the loaded conveyor portion.

6. The apparatus as claimed in claim 4 wherein said rotor housing includes a conical deflector extending laterally over a portion of the belt of the conveyor where the belt extends around the tail pulley, said conical deflector assisting in the deposition of the directed material onto the upper surface of the loaded conveyor portion.

7. The apparatus as claimed in claim 1 further including a belt return wiper positioned adjacent to the upper surface of the return conveyor portion and directing material on the upper surface of the return conveyor portion to said intake of said rotor housing.

8. The apparatus as claimed in claim 1 where said rotor is rotated independently from the tail pulley.

9. The apparatus as claimed in claim 1 wherein said housing includes a transparent portion to permit visual inspection of said rotor.

10. A self cleaning apparatus for a belt conveyor, the belt conveyor of the type having a continuous loop belt, mounted about a head pulley at one end of the conveyor and a tail pulley positioned on a tail pulley shaft at an opposite end of the conveyor, and further including a loaded conveyor portion and a return conveyor portion, each of the loaded and return conveyor portions having upper surfaces, the self cleaning apparatus comprising:
    a rotor positioned adjacent to an outer edge of the return conveyor portion of the belt, said rotor mounted to and rotating with the tail pulley shaft,
    a rotor housing received about said rotor, said rotor housing having an intake and a discharge, said intake positioned in proximity to the upper surface of the return conveyor portion of the belt and receiving and directing material on the upper surface of the return conveyor portion to said rotor as the belt rotates, such that rotation of said rotor by the tail pulley shaft causes the directed material to be propelled by said rotor through said discharge and to be deposited onto the upper surface of the loaded conveyor portion.

11. The apparatus as claimed in claim 10 including first and second rotors positioned on opposite ends of the tail pulley shaft, and further including first and second rotor housings, said first rotor housing received about said first rotor and said second rotor housing received about said second rotor.

12. The apparatus as claimed in claim 10 further including a belt return wiper positioned adjacent to the upper surface of the return conveyor portion.

13. The apparatus as claimed in claim 10 wherein said rotor housing includes a conical deflector extending laterally over a portion of the belt of the conveyor where the belt extends around the tail pulley.

* * * * *